Patented Mar. 5, 1929.

1,704,306

UNITED STATES PATENT OFFICE.

RAY L. STINCHFIELD, OF ROCHESTER, NEW YORK, ASSIGNOR TO EASTMAN KODAK COMPANY, OF ROCHESTER, NEW YORK, A CORPORATION OF NEW YORK.

SOLUBLE CELLULOSE ESTERS CONTAINING PHTHALIC GROUPS AND PROCESS OF MAKING THE SAME.

No Drawing. Application filed March 28, 1927, Serial No. 179,184. Renewed December 8, 1928.

This invention relates to cullulose esters containing phthalic groups, said esters being soluble in useful organic solvents. It also relates to processes of making such esters, whether such esters contain only phthalic groups, or whether they contain phthalic groups and other acyl groups. One object of the invention is to provide esters of cellulose containing phthalic groups, which will be soluble in such useful neutral organic solvents as acetone, chloroform or benzol, etc. Another object is to provide relatively direct and easily controlled processes for making such esters. Other objects will hereinafter appear.

So far as I am aware, no esters have heretofore been prepared which were both soluble in useful organic solvents and at the same time contained a cellulose group esterified with one or more phthalic groups. While cellulose esters containing very small amounts of the phthalic group have been described in The Journal of Industrial and Engineering Chemistry, August, 1920, page 743, " Cellulose phthalate: its preparation and properties " by H. A. Levey, said esters were not soluble in acetone, chloroform, benzol, or in fact, any of the useful organic solvents. Even the prolonged action of phthalic anhydrid in the presence of a catalyst, such as fused zinc chlorid, was incapable of producing sufficient esterification to obtain any solubility.

In the application of Clarke and Malm, filed of even date herewith, Serial No. 179,177 for " process of making cellulose esters of organic acids," there is described a new method of producing cellulose esters by treating them to the coaction of an organic acid and an organic anhydrid material, such as chloracetic anhydrid, which is a most powerful impeller of esterification, without itself contributing groups to the ester. But when this method is used with phthalic acid, no substantial esterification of the cellulose takes place. In other words, plain phthalic acid resists esterification even under the strongest known esterification-inducing conditions.

I have found that cellulose esters can be prepared, containing sufficient phthalic groups to render them soluble in useful organic solvents, by "inactivating" one of the carboxyl groups of phthalic acid, say by esterifying it, and causing the other carboxyl group to react with the cellulose to form the desired product. In the preferred form of my invention one carboxyl group of phthalic acid is esterified with an alcohol and the other carboxyl group of phthalic acid is esterified with the cellulosic material under the impulsion of an anhydrid substance, such as is described in the application of Clarke and Malm hereinabove referred to. Moreover, the phthalic groups may be introduced along with other acyl groups, preferably fatty acid groups. While I may form mixed esters containing phthalic groups and groups from any of the monocarboxylic unsubstituted aliphatic acids, such as acetic, propionic, butyric, crotonic, lauric, palmitic or stearic, (or in fact, any of the acids entering into the esters described in said Clarke and Malm application) I prefer to use acetic acid, because of its low cost, high activity, and the useful properties which it helps to impart to the mixed esters.

While my process can be used in treating hydrocellulose, and other degraded but highly active forms of cellulose, it is effective when substantially undegraded cellulose is employed. When such undegraded cellulose is converted into my novel esters, the latter possess superior properties over those produced from the degraded or hydrocellulose. I, therefore, prefer to use those forms of cellulose which are customarily employed in making high grade cellulose acetates. For example, I use cotton, with the ordinary purification and bleaching, cotton tissue paper, filter paper, purified surgeon's cotton wool and even carefully purified wood pulp, such as high grade sulfite wood pulp, which has been bleached. My process may be used for introducing phthalic groups into cellulose esters which still have free hydroxyl groups, such as the lower cellulose nitrates, acetates, formates, etc.

Several examples of my invention will now be given, but it will be understood that the latter is not restricted to the details thus described, except as indicated in the appended claims. The preparation of phthalic acid with one "inactivated" carboxyl presents no difficulty. The simplest way is to react upon phthalic anhydrid with an equimolecular proportion of an alcohol following conventional methods. For instance, I can react upon phthalic anhydrid with any one of the monohydroxy aliphatic alcohols, ethyl alcohol being the cheapest and satisfactory. Aromatic alcohols, such as benzyl alcohol and its homologues can also be used; but methyl, ethyl, propyl, butyl and amyl alcohols are the easiest to employ.

In carrying out the reaction between the phthalic acid mono ester and the cellulosic material it is desirable to have present a liquid which has a powerful solvent action on the ingredients in the bath. The halogenated monocarboxylic aliphatic alcohols containing less than four carbon atoms are especially useful. I prefer to employ monochloroacetic acid, because it is the least expensive and the most powerful. It is also desirable to carry out the reaction in the presence of a catalyst or condensing agent, preferably of a mild nature, such as fused zinc chlorid or magnesium perchlorate. The reaction is carried out at a temperature at least high enough to keep the bath melted (which may be somewhat less than the melting points of some of the ingredients, taken by themselves) and below the temperature at which cellulose or the product is degraded. It has been found that 50° to 80° C. is a useful working temperature, for instance. At such a temperature the time of the reaction is not unduly prolonged.

In one example, 2 parts by weight of cotton tissue paper, such as is used in manufacturing cellulose acetate, is thoroughly mixed into a bath comprising 15 parts by weight of ethyl hydrogen phthalate, 20 parts by weight of chloracetic anhydrid, 20 parts by weight of monochloracetic acid, 0.5 parts by weight of magnesium perchlorate trihydrate. The reaction mass is kept at 60° to 65° C. until the fibers of the paper disappear and the reaction mixture becomes a homogeneous,—that is, a clear dope is obtained. The time for reaching this result varies with different samples of cellulosic material, and I have found that it is often reached in about 72 hours. The clear reaction mixture is then precipitated in methyl alcohol, giving a white precipitate, which is washed with warm methyl alcohol. Upon drying, the phthalic ester of cellulose, thus produced, is wholly soluble in either acetone, chloroform, benzol or mixtures of these, but is insoluble in ligroin, ether, or carbon tetrachlorid.

In a second example, 2 parts by weight of cellulose tissue paper is thoroughly stirred into a bath containing 20 parts by weight of ethyl hydrogen phthalate, 30 parts by weight of chloracetic anhydrid, 10 parts by weight of monochloracetic acid, 2 parts by weight of acetic acid, and 0.5 parts by weight of magnesium perchlorate. The mixture is maintained at 60° to 65° C. until a homogeneous appearance results, the cellulose fibers having substantially disappeared. Usually a very clear and smooth dope is obtained in about 48 hours. The aceto phthalic ester of cellulose thus produced is separated from the other ingredients of the bath by precipitation in and washing with methyl alcohol. It is likewise soluble in either chloroform, acetone, benzol or mixtures of them. By increasing the amount of acetic acid in the above example, the proportion of acetyl groups in the finished ester may be increased at will.

All of the cellulose esters containing phthalic groups hereinabove described deposit transparent films or varnish layers upon evaporation of their solutions in the volatile solvents mentioned above. They may be mixed with other cellulose esters which are soluble in the same solvent, into plastic, film or filament-forming compositions. Layers of them may be combined with layers of other cellulose esters in laminated films or varnishes or other products, a common solvent being present to promote the union, in accordance with customary practice. Thus I may mix acetone-soluble phthalic esters of cellulose with acetone-soluble cellulose acetates, and combine them into colloidized products by means of acetone. Layers of my phthalic esters of cellulose may be united with layers of acetone-soluble cellulose acetate by means of a cement containing acetone; or a layer of one of these may be varnished or flowed over a layer of the other so as to adhere to it. Plastifiers or softeners, such as those hitherto used with acetone-soluble cellulose acetates, or chloroform-soluble cellulose acetates, may be combined with my cellulose phthalic esters in acetone or chloroform solutions, said plastifiers or softeners being used in about the same proportions in which they have been employed in connection with cellulose acetates. As examples, tricresyl phosphate, triphenyl phosphate, monochlornaphthalene and diacetin will serve out of the large number which could be mentioned.

It will be noted that the group used to "inactivate" one of the carboxyls of the phthalic acid remains in the finished cellulose ester. It offers a ready point of attack for the preparation of further and more complicated compounds.

In the above examples, I can use mono, di, or trichloracetic anhydrids, or mixtures of them, or mono, di, or tribromacetic anhydrids, or mixtures of them, or mono, di or trichlor or brom propionic and butyric anhydrids, as well as methoxy acetic, methoxy propionic, or methoxy butyric anhydrids. But there is nothing to be gained from the higher members of this group over monochloracetic anhydrid.

Having thus described my invention, what

I claim as new and desire to secure by Letters Patent is:

1. An organic ester containing a cellulose group esterified with a phthalic group, said ester being soluble in an organic solvent.

2. A phthalic ester of cellulose in which one carboxyl of a phthalic acid group is esterified with the cellulose group and the other carboxyl of the phthalic group is esterified with an alcohol.

3. An alkyl-phthalic ester of cellulose soluble in at least one of the groups of solvents, chloroform, acetone, benzol.

4. A mixed organic ester of cellulose containing a cellulose group esterified with both a phthalic group and a fatty acid group.

5. A mixed organic ester of cellulose in which the cellulose group is esterified with both a fatty acid group and with one carboxyl of a phthalic group, the other carboxyl of said phthalic group being esterified with an alcohol.

6. A cellulose aceto alkyl-phthalate, soluble in at least one of the groups of solvents, acetone, chloroform, benzol.

7. A cellulose ethyl-phthalic ester.

8. Cellulose ethyl-phthalate acetate.

9. In the process of making phthalic esters of cellulose, treating cellulosic material containing an esterifiable hydroxyl group to the coaction of a phthalic acid ester containing one free carboxyl group and a substituted organic anhydrid material which impels reaction between said hydroxyl and carboxyl groups.

10. In the process of making phthalic esters of cellulose, treating cellulosic material to the coaction of a hydrogen alkyl ester of phthalic acid, and a substituted fatty acid anhydrid which impels esterification, without itself contributing groups to the ester, the acid corresponding to said anhydrid containing less than five carbon atoms.

11. In the process of making phthalic esters of cellulose, treating cellulosic material to the coaction of hydrogen ethyl phthalate and chloracetic anhydrid.

12. In the process of making phthalic esters of cellulose, treating cellulosic material to the coaction of a hydrogen alkyl ester of phthalic acid, a cellulose esterifying acid, and a substituted organic anhydrid material which impels the esterification by said ester and said acid, without itself contributing groups to the cellulosic ester thus produced.

13. In the process of making phthalic esters of cellulose, treating cellulosic material in an esterifying bath containing a hydrogen alkyl ester of phthalic acid, an unsubstituted fatty acid, and a substituted fatty acid anhydrid, which impels esterification of the cellulose by said ester of phthalic acid and fatty acid, without itself contributing groups to the cellulose ester.

14. In the process of making phthalic esters of cellulose, treating cellulosic material in an esterifying bath containing a hydrogen alkyl ester of phthalic acid, acetic acid, a substituted anhydrid of a fatty acid, the acid corresponding to said anhydrid containing less than five carbon atoms.

15. In the process of making phthalic esters of cellulose, treating cellulosic material to the coaction of a hydrogen alkyl ester of phthalic acid, and a substituted fatty acid anhydrid which impels esterification of the cellulose by said ester, the acid corresponding to said anhydrid containing less than five carbon atoms, said esterification being conducted in the presence of a catalyst at a temperature above the melting point of the mixture, but below 170° C.

16. In the process of making phthalic esters of cellulose, treating cellulosic material containing an esterifiable hydroxyl group in an esterifying bath containing a phthalic acid ester having one free carboxyl group, a substituted organic anhydrid material which impels reaction between said hydroxyl and said carboxyl groups, and a common solvent of said ingredients of the bath and of the products produced in the reaction.

Signed at Rochester, New York, this 24th day of March, 1927.

RAY L. STINCHFIELD.